No. 892,114. PATENTED JUNE 30, 1908.
G. ANDERSON.
SHEAVE HEADER.
APPLICATION FILED JAN. 9, 1908.
2 SHEETS—SHEET 1.
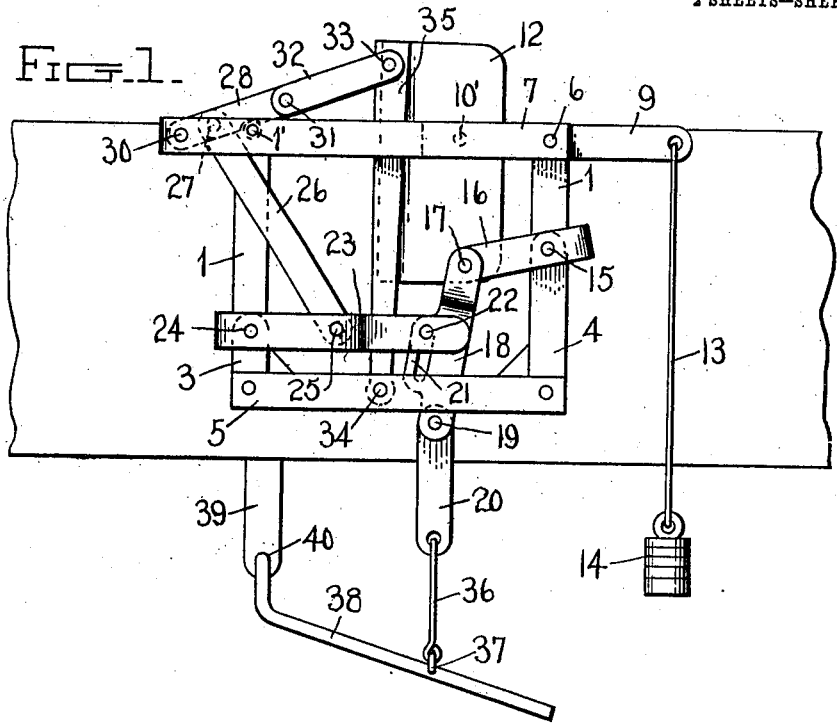
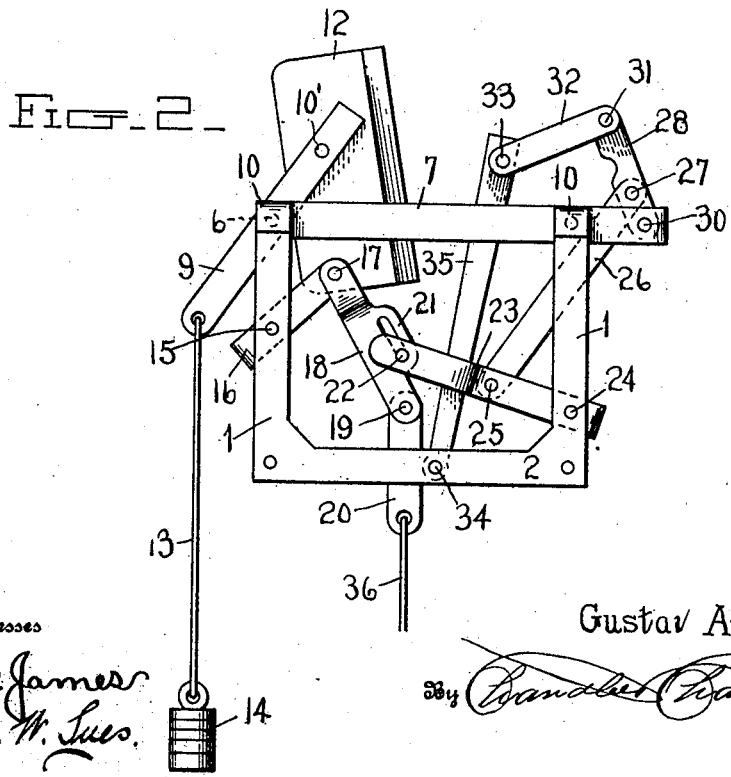
Witnesses
L. B. James
Geo. W. Sues
Inventor
Gustav Anderson
By Brandles & Brandles
Attorneys No. 892,114. PATENTED JUNE 30, 1908.
G. ANDERSON.
SHEAVE HEADER.
APPLICATION FILED JAN. 9, 1908.
2 SHEETS—SHEET 2.
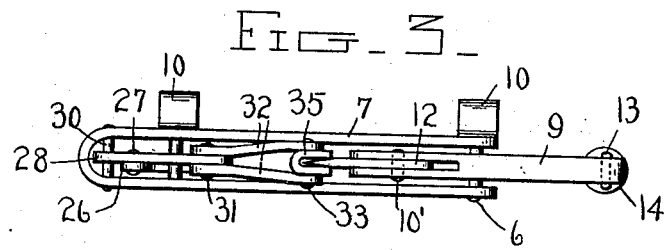
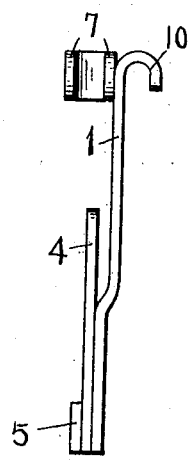
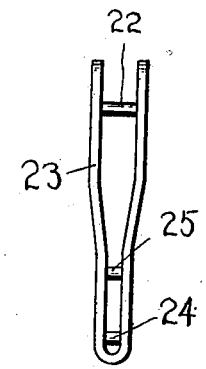
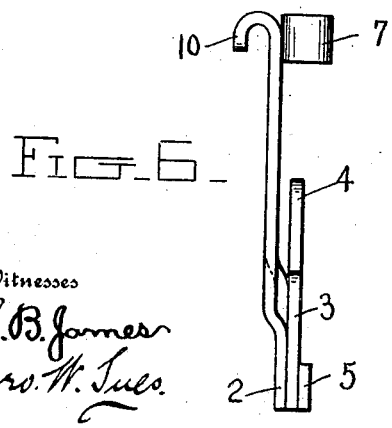
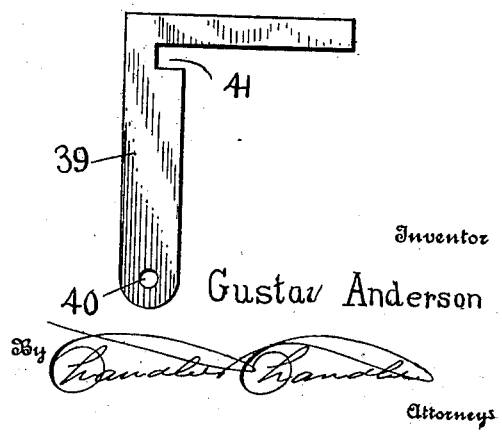
Witnesses
L. B. James
Geo. W. Jues.
Inventor
Gustav Anderson
By Chandler & Chandler
Attorneys

UNITED STATES PATENT OFFICE.

GUSTAV ANDERSON, OF DUNLAP, KANSAS.

SHEAVE-HEADER.

No. 892,114.  Specification of Letters Patent.  Patented June 30, 1908.

Application filed January 9, 1908. Serial No. 410,046.

*To all whom it may concern:*

Be it known that I, GUSTAV ANDERSON, a citizen of the United States, residing at Dunlap, in the county of Morris, State of Kansas, have invented certain new and useful Improvements in Sheave-Headers; and I do hereby declare the following to be a full, clear, and exact description of the invention, such as will enable others skilled in the art to which it appertains to make and use the same.

This invention relates to a new and useful sheave header.

The object of my invention is to provide a simply constructed cutting mechanism so arranged that it may be secured to the sides of an ordinary farm wagon in heading or cutting off the tops of a sheave or bundle of cane or Kafir corn.

In the accompanying drawings I have shown in Figure 1 a broken portion of a farm wagon disclosing my sheave header in one of its extreme positions. Fig. 2 shows the header in its open position to receive a sheave or bundle of corn, as shown from the rear. Fig. 3 is a top view of the sheave header. Fig. 4 is an end view of the supporting frame with the knives and toggles removed. Fig. 5 discloses a top view of the recurved cam rocked arm as used in my invention. Fig. 6 discloses an end view of the supporting frame, while, Fig. 7 shows a detail of the fulcrum arm as used in my invention.

In preserving the seed of cane and Kafir corn, it is necessary first to top the stalks in the field and these topped seed carrying ends are then bound into suitable sheaves to be cured. In order to thresh the seed out of the heads these have to be cut from the remaining bound stalk portions and it is the aim and object of this invention to provide a header sufficiently large and strong so that the bound sheaves may be topped or headed at one operation.

In carrying out the aim of my invention I construct a rectangular frame comprising the two similar end members 1, 1 which are below secured by means of a bottom member 2 as shown in Fig. 2. At one end I provide this supporting frame with a stub post 3 as shown in Figs. 1 and 6 while at the end opposite I provide the pivot post 4 shown in Figs. 1 and 4. Spanning from the stub post 3 to the opposite post 4 is a front bottom bar 5 so that a suitable space is provided between the bars 2 and 5. Held upon the pivot pin 6 which passes through the open end of the upper recurved frame bar 7 as shown in Fig. 3 is the weight-provided knife lever 9. This knife lever 9 is provided with a pivot pin 10' by means of which this lever is pivotally connected to the knife 12 shown in Figs. 2 and 3. The opposite end of this knife lever 9 has secured to it a wire or rope 13 supporting a suitable weight 14. The post 4 as shown in Fig. 1 carries the pin 15 which in turn supports the knife link 16 having a pivot pin 17 at its forward end by means of which the same is pivotally secured to the knife 12.

In referring to Fig. 3 it will be noticed that the knife lever 9 is slotted and that the blade 12 is held within the slotted end of this knife lever by means of the pin 10'. The lower knife link 16 is bent U-shaped and between the two forward ends of the link 16 the lower end of the blade 12 is held. Pivotally secured to the pin 17 is a cam arm 18 carrying a pivot 19 from which is held pendent the bar 20 as shown in Fig. 1. This cam arm 18 is provided with a cam slot 21 within which is slidably held the pin 22 which pin 22 is held between the forward ends of the rock arm 23, a top view of this rock arm being shown in Fig. 5.

At its recurved end this rock arm 23 is provided with a supporting pin 24 which passes through the stub post 3 and so tiltably holds this rock arm 23. Intermediate of its ends this rock arm is provided with a pin 25 which is adapted to receive the connecting rod 26 which rod at its upper end is connected by means of a pin 27 to the toggle bar 28. This toggle bar 28 by means of a pin 30 is pivotally secured within the recurved end of the upper frame bar 7 as disclosed. The pin 31 connects the toggle bar 28 to a similar toggle bar 32 and this toggle bar 32 in turn by means of a pin 33 is pivotally connected to the sheathing lever 35 which is U-shaped in cross section and is adapted to receive the cutting edge of the knife 12. In Fig. 3 a top view of this sheathing lever is disclosed. By means of a pivot pin 34 passing through the lower frame members 2 and 5 this sheathing lever is pivotally supported as disclosed. Extending from the bar 20 is a strand 36 having a terminal ring 37 adapted to receive an operating bar 38 the end of which is placed into the perforation 40 of the fulcrum arm 39 shown in detail in Fig. 7 which arm is provided with a slot 41 so that the same may be secured to the lock platform of a suitable farm wagon. In Fig. 1, the lower end of this arm is shown, which is secured to the wagon box on the side opposite to that upon which the header is carried. Now when this sheave header has been properly arranged for working purposes, the knife by means of the weight 14 will be carried upward and away from the sheathing lever as disclosed in Fig. 2. Now the sheave to be headed is placed between the lever 35 and the knife and the operator presses his foot upon the bar 38 which, if desired, could also be an ordinary gas pipe, to carry the cam arm 18 downward which will result in the knife being carried both forward and downward, being pivotally held between the lever 9 and the link 16. Now as the cam arm 18 is carried down it actuates the rock arm 23 through the medium of the cam 21 and the pin 22 so that this rock arm is carried downward and as this rock arm descends it carries with it the connecting rod 26 which in turn draws down the toggle 28 so that the connected toggle 32 forces outward and towards the knife 12, the sheathing lever 35, both edges of which lever pass the cutting edge of the knife as will be understood in referring to Fig. 3. As soon as the operator releases his foot from the operating bar 38, the weight 14 at once promptly descends carrying downward the lever 9 to again place the knife in its open cutting position. By means of the recurved ends 10 which form a part of the end members 1, this sheave header is especially adapted to be secured to the sides of a wagon or to the edge of a suitable bin so that the heads as they are separated drop into the wagon box, or bin.

The device is light and simple of construction, and having thus described my said invention what I claim as new is 1. In a device of the character described, the combination with a suitable supporting frame, of a stub post secured to said frame at one end, a pivot post secured to said frame at the opposite end, a rocking arm pivotally mounted upon said stub post, a knife link pivotally mounted upon said pivot post, a cam arm pivotally secured to said knife link, a pin projecting from said rock arm in engagement with said cam arm, a weight-provided knife lever pivotally secured to said supporting frame, a knife pivotally secured to said weight-provided lever and said knife link, a sheathing lever pivoted at its lower end to said supporting frame and adap ed to sheath and encompass the cutting edge of said knife, a connecting rod extending from said rock arm, a toggle bar pivoted to said supporting frame, said connecting rod being secured to said toggle bar, and a second toggle bar pivotally secured to said first mentioned toggle bar and said sheathing lever.

2. In a device of the character described, the combination with a suitable supporting frame, of a stub post secured to said frame at one end, a pivot post secured to said frame at the opposite end, a rocking arm pivotally mounted upon said stub post, a knife link pivotally mounted upon said pivot post, a cam arm pivotally secured to said knife link, a pin projecting from said rock arm in engagement with said cam arm, a weight-provided knife lever pivotally secured to said supporting frame, a knife pivotally secured to said weight-provided lever and said knife link, a sheathing lever pivoted at its lower end to said supporting frame and adapted to sheath and encompass the cutting edge of said knife, a connecting rod extending from said rock arm, a toggle bar pivoted to said supporting frame, said connecting rod being secured to said toggle bar, a second toggle bar pivotally secured to said first mentioned toggle bar and said sheathing lever, and operating means connected to said cam arm, all arranged substantially as and for the purpose set forth.

In testimony whereof, I affix my signature, in presence of two witnesses.

GUSTAV ANDERSON.

Witnesses:
 M. M. HYLTON,
 E. W. ADAM.